US006048482A

United States Patent [19]

Lemke et al.

[11] Patent Number: 6,048,482
[45] Date of Patent: Apr. 11, 2000

[54] METHOD FOR MANUFACTURING AN ELECTRICAL CONNECTOR

[75] Inventors: Timothy A. Lemke, Dillsburg; Timothy W. Houtz, Etters, both of Pa.

[73] Assignee: Berg Technology, Inc., Reno, Nev.

[21] Appl. No.: 09/046,482

[22] Filed: Mar. 23, 1998

Related U.S. Application Data

[62] Division of application No. 08/672,592, Jun. 28, 1996, Pat. No. 5,902,136.

[51] Int. Cl.[7] .......................... B29C 70/72; B29C 70/84; B29C 70/88

[52] U.S. Cl. .......................... 264/251; 264/277; 29/883; 29/876

[58] Field of Search .......................... 264/272.11, 272.14, 264/272.15, 271.1, 219, 250, 251, 275, 277; 425/175; 29/881, 883, 876

[56] References Cited

U.S. PATENT DOCUMENTS

| | | | |
|---|---|---|---|
| 4,339,407 | 7/1982 | Leighton | 264/272.14 |
| 4,614,630 | 9/1986 | Pluim, Jr. | 264/219 |
| 4,829,667 | 5/1989 | Thompson et al. | 264/272.14 |
| 4,925,611 | 5/1990 | Shockney et al. | 264/219 |
| 5,057,027 | 10/1991 | Yamada et al. | 439/74 |
| 5,057,028 | 10/1991 | Lemke et al. | 439/108 |
| 5,098,311 | 3/1992 | Roath et al. | 439/289 |
| 5,133,670 | 7/1992 | Doi et al. | 439/79 |
| 5,156,523 | 10/1992 | Hoffman . | |
| 5,176,541 | 1/1993 | Mori | 439/736 |
| 5,192,232 | 3/1993 | Lenz et al. | 439/660 |
| 5,277,597 | 1/1994 | Masami et al. | 439/83 |
| 5,376,009 | 12/1994 | Olsson et al. | 439/74 |
| 5,626,482 | 5/1997 | Chan et al. | 439/74 |
| 5,639,248 | 6/1997 | Yagi | 439/74 |

FOREIGN PATENT DOCUMENTS

| | | |
|---|---|---|
| 0 567 007 A2 | 10/1993 | European Pat. Off. . |
| 0 658 951 A1 | 6/1995 | European Pat. Off. . |
| 0 693 802 A2 | 1/1996 | European Pat. Off. . |

*Primary Examiner*—Angela Ortiz
*Attorney, Agent, or Firm*—Daniel J. Long; Brian J. Hamilla; M. Richard Page

[57] ABSTRACT

Disclosed is an electrical connector which includes a plug comprising at least one insulative lateral support, an insulative medial lateral support and a wire having a first longitudinal section fixed to the insulative lateral support, a second longitudinal sectional fixed to the insulative medial support and an exposed third longitudinal section interposed between said first longitudinal section and said second longitudinal section. The connector also includes a receptacle comprising at least one insulative support and a wire having a first longitudinal section fixed to the insulative support and an exposed second longitudinal section of the plug. Also disclosed is a method of manufacturing this connector and a mold for use therein.

2 Claims, 4 Drawing Sheets

METHOD FOR MANUFACTURING AN ELECTRICAL CONNECTOR

This application is a division of application Ser. No. 08/672,592 filed Jun. 28,1996, now U.S. Pat. No. 5,902,136.

CROSS REFERENCE TO RELATED APPLICATIONS

This is related to U.S. application Ser. No. 60/020,780, now abandoned, entitled "Integrated Strain Relief Microminiature Connector", U.S. application Ser. No. 60/020,787, now abandoned, entitled "Microminiature Connector With Low Cross Talk" and U.S. application Ser. No. 60/020,831, now abandoned, entitled "Insert Molded Straddle Mounted Connector", all filed on Jun. 28, 1996 and International Application PCT/US97/11157, filed Jun. 27, 1997, entitled "Electrical Connector".

BACKGROUND OF THE INVENTION

1. Field of the Invention

The present invention relates to electrical connectors and more particularly to electrical connectors which are used for miniaturized, high density and high pin count applications.

2. Brief Description of Prior Developments

Recent advances in the design of portable or mobile electronic equipment have required that connector technology keep pace with the trends of miniaturization and functional complexity. Connectors used in such applications need to be more substantially densely packaged than was heretofore generally required. Such board to board types of connectors are usually used to interconnect two printed circuit boards in an "mezzanine" configuration. Such uses require connectors not only with smaller contact pitches, but, in some cases, with lower mating heights, as well. The resulting increased packaging density must ordinarily be achieved without significant sacrifice of mechanical ruggedness since such connectors may be subjected to unusually high stresses because of the nature of the application. For example, miniaturized or mobile type products are subject to high stresses if they are dropped or otherwise abused. Such high stresses have the potential for damaging connector housings, contacts and solder joints. Furthermore, the connectors themselves might separate if sufficient retention forces are not available.

The "blade-on-beam" connector design is commonly used for miniaturized designs of 0.8 mm and less. This design typically uses a single cantilever beam type of contact for the spring contact which mates an associated blade contact, which does not have spring characteristics. The contact beams generally can be of two configurations.

One such configuration is an edge stamped or "tuning fork" configuration in which the contact is blanked from flat material and reoriented 90 degrees when it is inserted into the housing so that the blanked edge of the beam is in contact with the blade. This design has the advantage that complex configurations which have a high degree of compliance can be easily stamped. The cantilever beam geometry can also be optimized by stamping an idealized shape into the profile of the beam. For example, a constant stress beam with a parabolic shaped thickness profile might be readily stamped. This approach might allow for lower contact height and tighter pitch contacts. The mounting of the contact in the housing is generally accomplished by individually stitching the contacts into the housings.

An alternative design makes use of a more conventional approach in which the beam is stamped so that the rolled edge of the material is in contact with the blade. In this case the contacts can usually be stamped on the same pitch as the final configuration, and the forms of the contact are created by bending the material during the die stamping operation. Although these beams are usually not quite as mechanically efficient as the edge stamped design, they often are more cost effective since they can be mass inserted or insert molded into the housing thus making assembly either easier or less costly from either a product or machine standpoint. This type of product is also easier to electroplate and the contact surface is usually superior to the edge stamped type of contact.

The design of connectors with a contact pitch of less than 1 mm and with mating height of less than 5 mm often presents particularly difficult design problems. The small pitch of the contacts require tightly controlled tolerance on the pitch to prevent shorts. This requirement for precision and accuracy extends to the contact forms and housing geometry's as well. This design process is further complicated by the high internal stress generated by the contact beams themselves, which can generate distortions of the housings and result in reduced contact forces over a period of time, particularly at elevated temperatures. If these connectors are to be manufactured reliably, unique manufacturing methods are required, which can assure the dimensional accuracy as well as physical strength of the product within the dimensional constraints of the product requirements.

There is, therefore, a need for an electrical connector that is not only denser, smaller, but is mechanically rugged. This all needs to be accomplished in the context of lowered manufacturing costs. Some of the specific requirements for this class of connectors may be that contact pitch is from 0.8–0.5 mm, mating height is from 8 mm–3 mm, connector width is from 6–7 mm and pin count of from 10 pos–200 pos.

SUMMARY OF THE INVENTION

The electrical connector of the present invention fills the above stated need and comprises a first element comprising (i) at least one insulative lateral support means, (ii) an insulative medial lateral support means and (iii) a conductive means having a first longitudinal section fixed to the insulative lateral support means, a second longitudinal sectional fixed to the insulative medial support means and an exposed third longitudinal section interposed between said first longitudinal section and said second longitudinal section. This connector would also include a second element comprising (i) at least one insulative support means and (ii) a conductive means having a first longitudinal section fixed to the insulative support means and an exposed second longitudinal section which is in contact with the exposed third longitudinal section of the first element.

Also encompassed within the invention of the present invention is a method for manufacturing the above described connector. A mold is first produced. This mold includes a first mold member having a planar section and a medial projection having a medial surface and opposed lateral surfaces.

The mold also includes a second mold member having a medial section and a pair of inner opposed lateral projections and a pair of outer opposed lateral projections the second member is capable of being superimposed over said first member such that each of said inner opposed lateral projections are positioned adjacent the opposed lateral surfaces of the medial projection of the first member and that each of said outer opposed lateral projections are adjacent the planar section of the first member such that a medial cavity and opposed lateral cavities are forward between said first and second members.

A pair of opposed conductive members having inner and outer terminal ends are then interposed between said first and second mold members such that the inner terminal ends are in spaced relation in the medial cavity. Each of the conductive members is interposed in contacting relation between one of the opposed lateral surfaces of the medial projection of the first member and one of the inner lateral projections of the first member. The conductive members pass through one of the lateral cavities and then are interposed in contacting relation between the planar section of the first member and one of the outer lateral projections. In manufacturing the receptacle element, the lateral cavities of the mold are at least partially filled with a liquid polymeric molding compound and allowing said molding compound to solidify so as to form opposed solid insulative lateral support structures each having one of said conductive elements embedded therein. In manufacturing the plug, the lateral cavities and the medial cavity are filled with the liquid polymeric molding compound.

BRIEF DESCRIPTION OF THE DRAWINGS

The invention is further described with reference to the accompanying drawings in which.

DETAILED DESCRIPTION OF THE PREFERRED EMBODIMENTS

Figure 2:
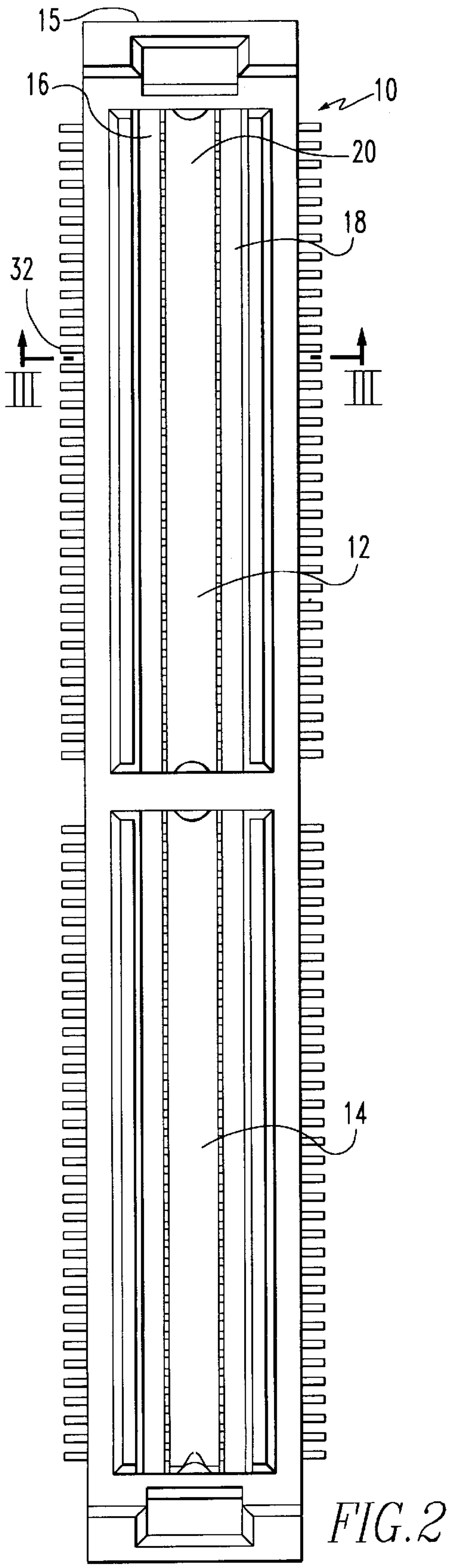
FIG. 2 is a top plan view of the connector shown in FIG. 1.
Figure 1:
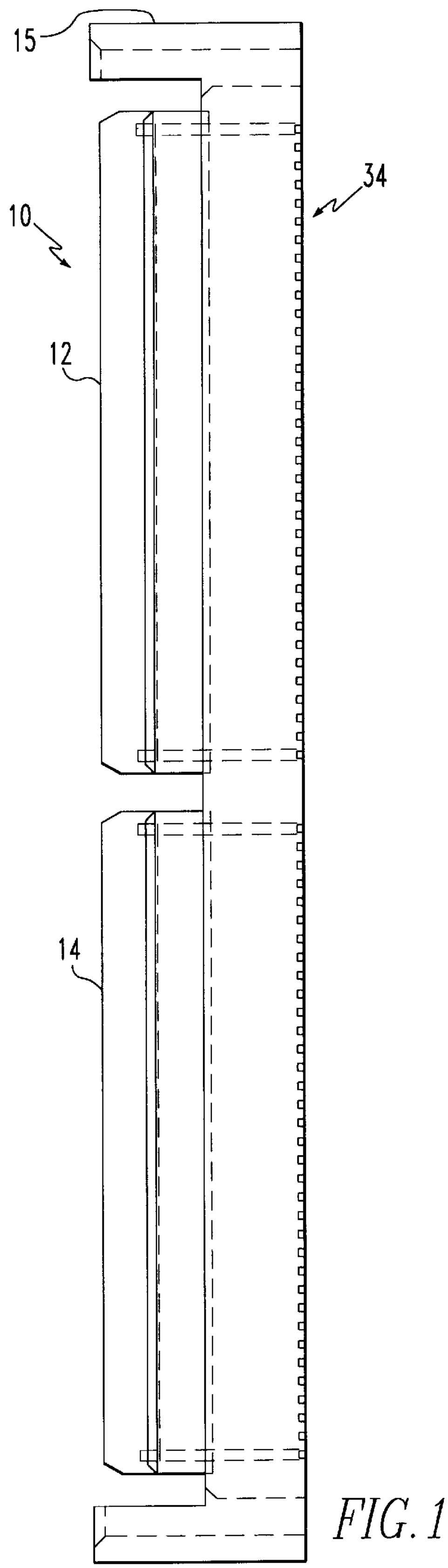
FIG. 1 is a side elevational view of a preferred embodiment of the connector of the present invention.
Figure 3:
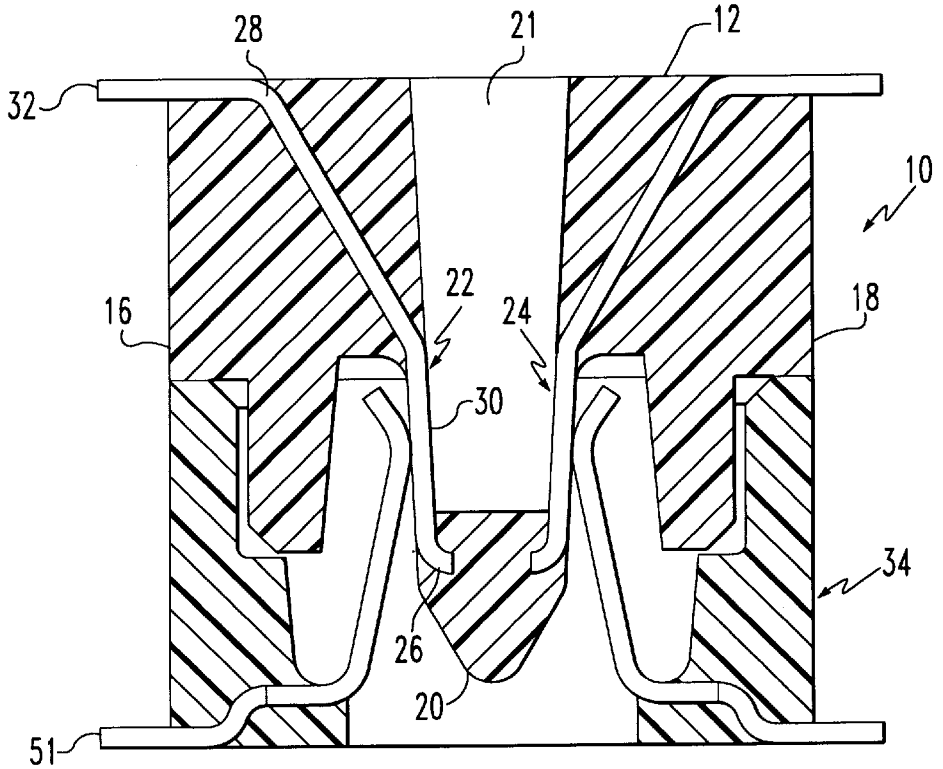
FIG. 3 is a cross sectional view through III—III in FIG. 2.

Referring to FIGS. 1–3, the connector includes a plug shown generally at numeral 10 which is made up of two elongated sections 12 and 14. It will, however, be understood that these two elongated sections can be joined to form a single elongated section. At each end the plug has a guide feature as at 15. As will be seen particularly from FIG. 3 the plug is comprised of elongated lateral supports 16 and 18 and a parallel medial support 20. There is an open space 21 between the lateral supports and above the medial support in the plug. The plug also includes a plurality of opposed blade elements shown generally at numerals 22 and 24. Each of these blades includes a first section 26 which is partially embedded in one of the lateral supports and a second section 28 which is embedded in a medial support. Interposed between these first and second sections there is an exposed third section 30. An exposed solder tail 32 also extends outwardly from the second section.

Figure 6:
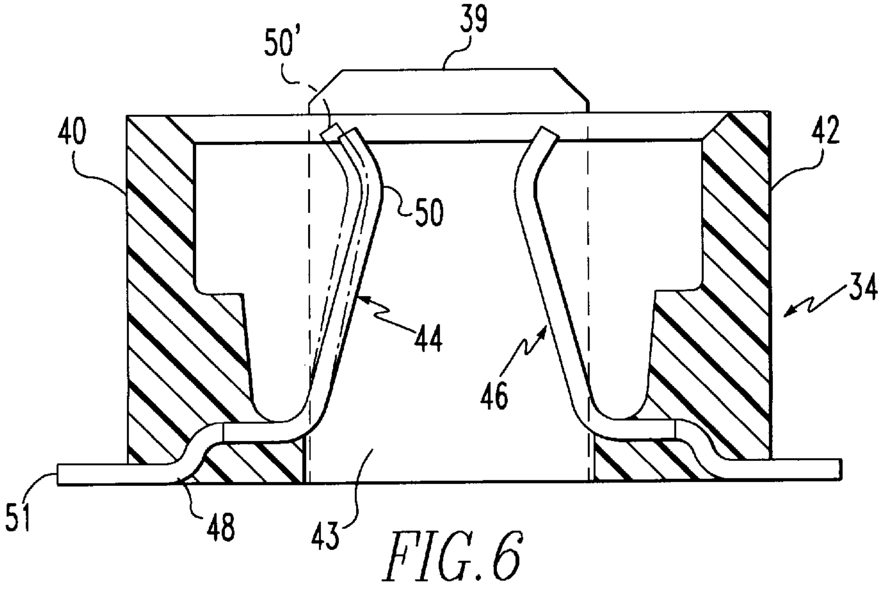
FIG. 6 is a cross sectional view through VI—VI in FIG. 5.
Figure 4:
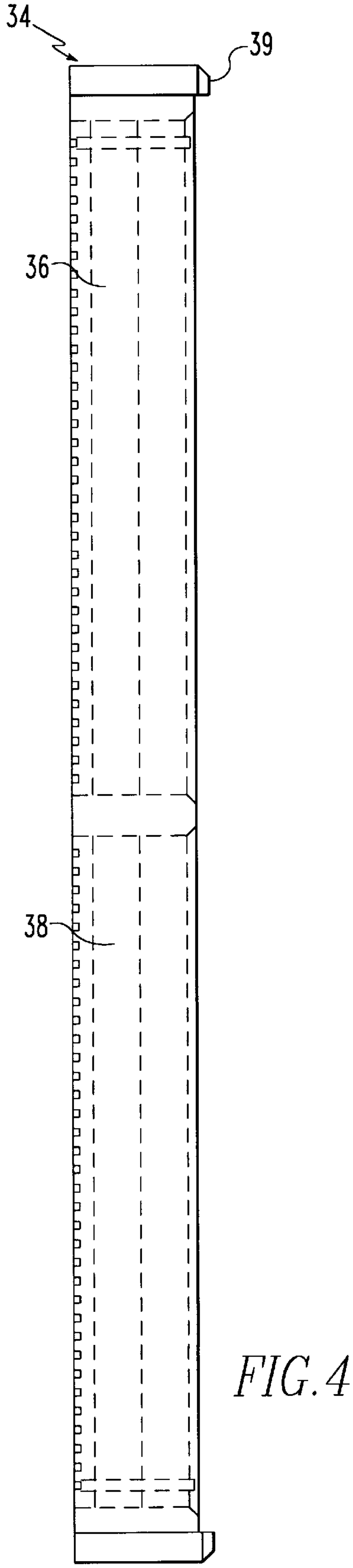
FIG. 4 is a side elevational view of the receptacle element shown in FIG. 1–3.
Figure 5:
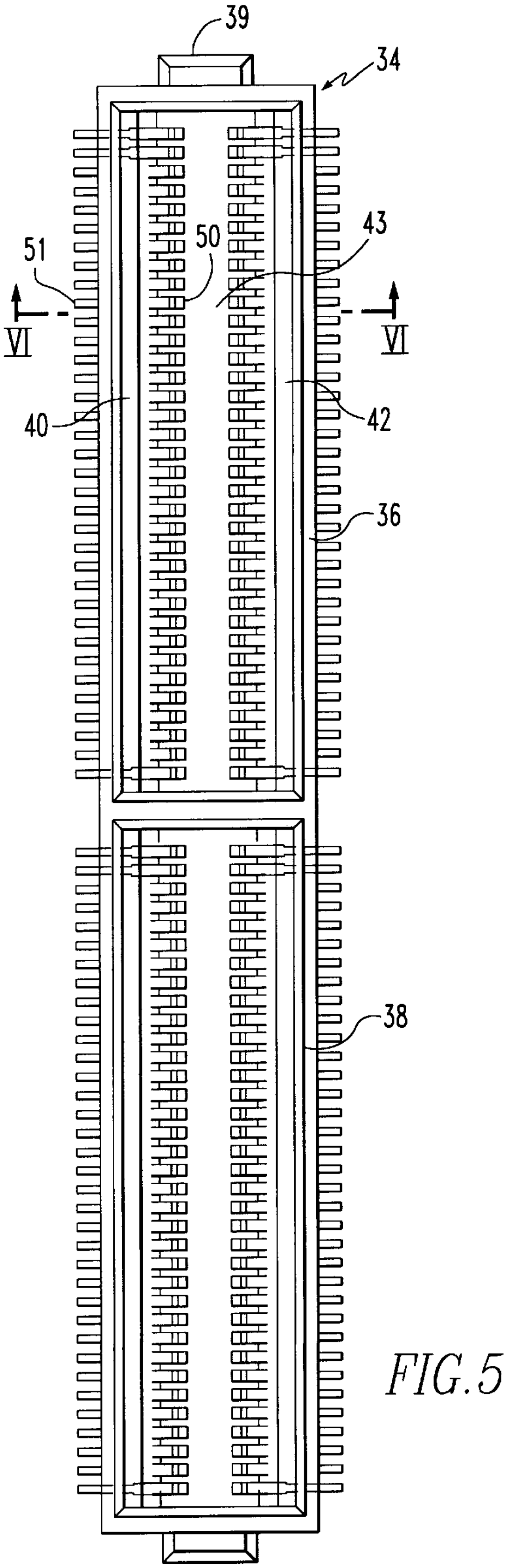
FIG. 5 is a top plan view of the receptacle shown in FIG. 4.

Referring to FIGS. 1–6, and particularly FIGS. 3–6, the connector also includes a receptacle shown generally at numeral 34. This receptacle includes elongated openings 36 and 38 which receive respectively the elongated sections 12 and 14 of the plug. At each end the receptacle has a guide pin as at 39 which engages a guide feature on the plug. Referring particularly to FIGS. 3 and 6, it will be seen that this receptacle includes elongated insulative lateral supports 40 and 42 which are positioned in opposed parallel relation. Between these lateral supports there is an open space 43. A plurality of parallel conductive beams as at 44 and 46 extend in opposed relation from each of these lateral supports. Each of these beams has a first section 48 which is embedded in one of the lateral supports and a second exposed section 50 which extends upwardly and inwardly to contact one of the blade elements of the plug. The flexed position of the second exposed section shown at 50'. A solder tail 51 also extends from the first section 48.

Figure 7:
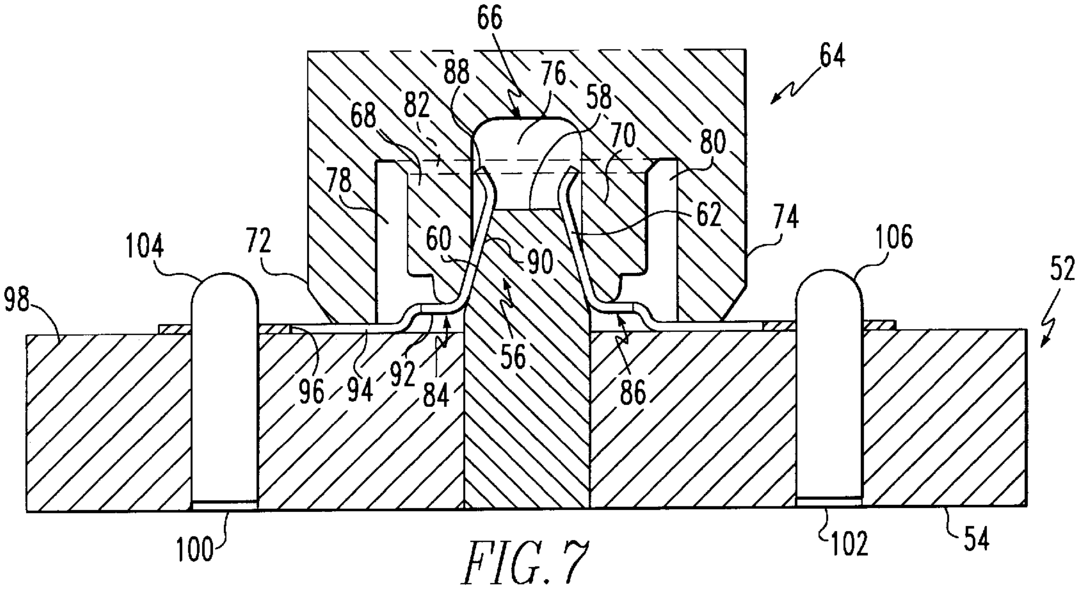
FIG. 7 is a transverse cross sectional view of a mold which would be used in manufacturing the connector shown in FIGS. 1–3.

Referring to FIG. 7, a mold for producing the receptacle element of the connector is shown. This mold includes a first mold member 52 which is made up of a planar section 54 which has a medial projection 56. This medial projection has a planar medial surface 58 and slopped lateral surfaces 60 and 62. There is also a second mold member 64 which has a planar section 66 from which inner opposed lateral projections 68 and 70 depend. Outwardly spaced from these inner opposed lateral projections are outer opposed lateral projections 72 and 74. The second mold member may be superimposed over the mold member so as to form a medial cavity 76 above the medial projection 56. Lateral cavities 78 and 80 would also be formed between the inner and outer projections of the second mold member and the planar section of the first mold member. As is conventional, the mold would have a gate (not shown) for introducing a liquid molding compound into the medial and lateral cavities. A narrow transverse connecting channel 82 would also serve to connect the two lateral cavities 78 and 80. In using this mold to manufacture a connector element, conductive members 84 and 86 would be interposed between the two mold members. Each of these conductor members has a first inner terminal end 88 which would be positioned in the medial cavity 76. The conductive members would also have a second section 90 which would be interposed between the inner projections of the second mold member and the lateral surfaces of the medial projection of the first mold member. Outwardly from the second section of the conductive members there would be a third section 92 which would be positioned in one of the lateral cavities 78 or 80. A fourth section 90 for the conductive member would be interposed between the outer projection of the second mold member and the planar section of the first mold member. Conductive members would also have an exterior exposed section 96 with a strip outer terminal end 98. The planar section of the first mold member would have outer opposed bores 100 and 102 which would receive pilot pins 104 and 106. These pilot pins would engage the conductive members adjacent their outer terminal ends.

To use the mold as described above to manufacture a receptacle the lateral cavities would be at least partially filled with a suitable polymeric molding compound preferably a liquid crystal polymer. The medial cavity would remain unfilled with the molding compound. A suitable molding compound is VECTRA available from Amoco. The molding compound would solidify to form the solid lateral supports in which the conductive elements are embedded as was described above. After solidification takes place the mold members would be removed in a conventional manner.

To use the mold as described above to produce a plug the lateral cavities as well as the medial cavity would be at least partially be filled with a suitable polymeric molding compound, preferably a liquid crystal polymer. A suitable molding compound is VECTRA available from Amoco. The molding compound would then be cured in a conventional manner to produce the lateral supports and medial supports in which the blade conductive element as described above would be at least partially embedded.

Figure 8:
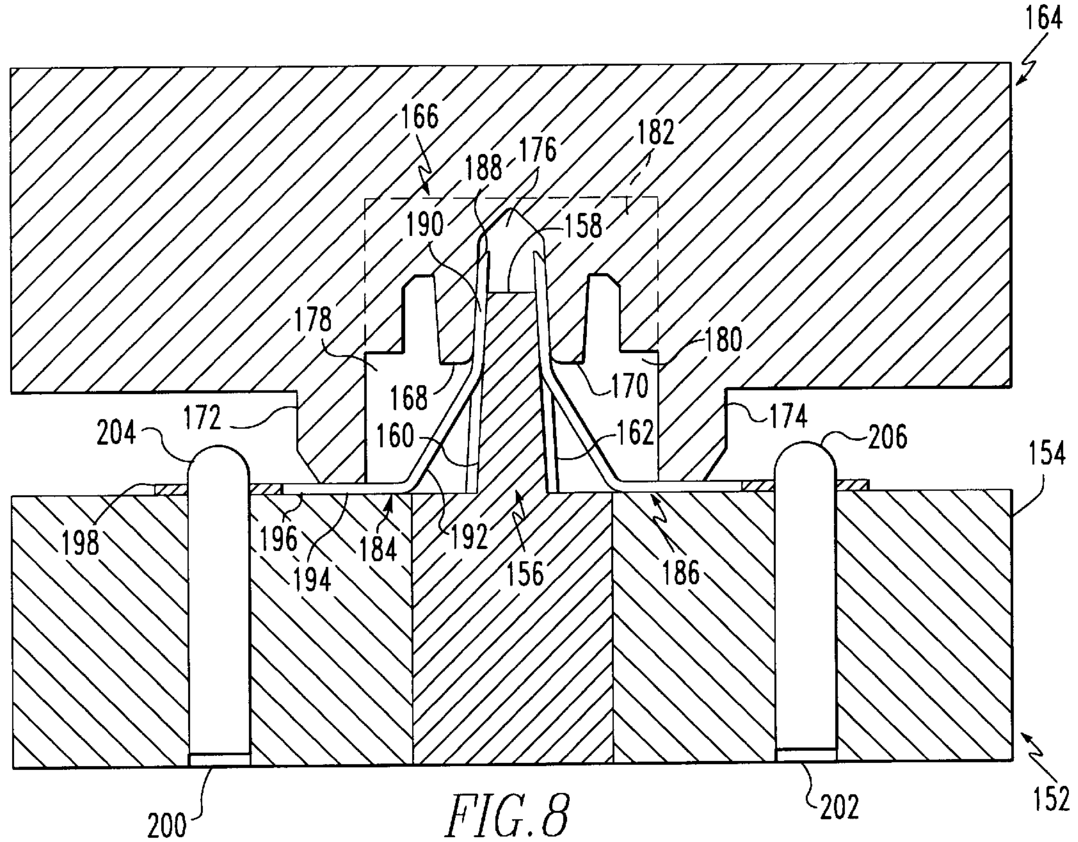
FIG. 8 is a transverse cross sectional view of another mold which would be used in manufacturing the connector shown in FIGS. 1–3.

Referring to FIG. 8, a mold specifically adapted to manufacture the plug element described above is described as follows:

This mold includes a first mold member 152 which is made up of a planar section 154 which has a medial projection 156. This medial projection has a planar medial surface 158 and slopped lateral surfaces 160 and 162. There is also a second mold member 164 which has a planar section 166 from which inner opposed lateral projections 168 and 170 depend. Outwardly spaced from these inner opposed lateral projections are outer opposed lateral projections 172 and 174. The second mold member may be superimposed over the mold member so as to form a medial cavity 176 above the medial projection 156. Lateral cavities 178 and 180 would also be formed between the inner and outer projections of the second mold member and the planar section of the first mold member. As is conventional, the mold would have a gate (not shown) for introducing a liquid molding compound into the medial and lateral cavities. A narrow transverse connecting channel 182 would also serve to connect the two lateral cavities 178 and 180. In using this mold to manufacture a connector element, conductive members 184 and 186 would be interposed between the two mold members. Each of these conductor members has a first inner terminal end 188 which would be positioned in the medial cavity 176. The conductive members would also have a second section 190 which would be interposed between the inner projections of the second mold member and the lateral surfaces of the medial projection of the first mold member. Outwardly from the second section of the conductive members there would be a third section 192 which would be positioned in one of the lateral cavities 178 or 180. A fourth section 190 for the conductive member would be interposed between the outer projection of the second mold member and the planar section of the first mold member. Conductive members would also have an exterior exposed section 196 with a strip outer terminal end 198. The planar section of the first mold member would have outer opposed bores 200 and 202 which would receive pilot pins 204 and 206. These pilot pins would engage the conductive members adjacent their outer terminal ends. This mold would be used to manufacture this particular plug shown in FIG. 3 in the same way as was described above in connection with the mold shown in FIG. 7.

The method of this invention involves molding the housing around the contacts as an approach to manufacturing this class of products, rather than molding thermoplastic housing and subsequently inserting or stitching contacts into the housings. In this process the contacts are stamped on continuous strip at the pitch of the final application. For example, contacts for a 0.5 mm pitch connector will be stamped on 0.5 mm. The nature of the stamping operation allows for very tight tolerance control of this process since the pitch of the stamping can be held to within tenths of thousandths of an inch. Secondary stamping operations might be used to perform bends in the stamped strip, but in any case the contact strip is then placed into the mold and plastic material is molded around the contacts, preserving their spatial relationship to one another. The contact carrier strip can be then removed, and the pitch is preserved by the housing. This procedure is an improvement over stitching contacts into a housing, where the relationship of the contacts to each other is entirely determined by the pre-molded housing. Since the contacts are completely embedded in the thermoplastic material, the base of the cantilever beam is uniformly and securely held in the plastic matrix. This procedure allows for heavier wall thicknesses and more uniform stress distribution as compared to a stitched or mass inserted part, when the contact beam is deflected during use. This secure contact will lessen the potential for stress relaxation of the contact because of permanent deformation of the plastic material and will result in higher contact forces over the life of the product, as compared to alternative manufacturing methods.

Preferably, both contacts of the connector, particularly the cantilever beam contact half (receptacle), should be molded simultaneously for a number of reasons. Multiple piece designs would be more costly than single piece ones. The structural integrity of a single piece design would be better in a one piece design as compared to multiple pieces, and the tolerances or variability of a one piece design would be less. However, molding two rows of contacts in this configuration is not a simple matter. It is difficult design mold tooling that will seal the plastic around the contact areas (the "seal-off" tooling) without complex camming of the mold or fragile easy to damage tooling. This must also be done without compromising the structural integrity of the part. There are several methods by which this can be accomplished. Preferably the mold should be a straight draw mold with no or limited camming actions in mold. The "seal-off" area at the interface between the plastic housing and the contact should be a flat area preferably with an interface angle of less than 45 degrees. In the case above the contact beams were molded at less than 45 degrees and then bent into position by means of a pin or blade that could be inserted through an aperture in the bottom of the connector. A second, and probably a preferred case would be to design the housing so that tooling can be placed on the outside of the connector contact, from the bottom of the connector and from the top. This procedure allows an open bottom in the connector structure. The two halves of the connector would be designed so that the shroud, which protects the plug contact would mate internally on the receptacle as compared to most designs in which the shroud is external to the receptacle housing. This prevents the connector from becoming too wide, and allows for relatively heavy walls to be molded at the base of the receptacle.

The plug portion of the connector is similarly molded as a one-piece unit. Again, in this case two contact strips are placed into a mold and with appropriate coring, the contacts are secure in a plastic matrix. In this case the contact portion is molded at a slight taper so that proper "seal-off" can be maintained. In this particular design the coring provides an area underneath the contact area of the plug which is devoid of plastic material, and the contact beams are supported by a bar of plastic material which embeds the ends of the contacts. This bar is attached intermittently and at the ends to the base of the plug. One advantage of this approach is that it minimizes the potential for a flash of plastic material to flow into the contact area. It also eliminates plastic material between the contacts, which can result in improved electrical crosstalk performance between the contacts and between rows of contacts.

In low mating height connectors, the insert molding of the contacts into the housing can allow for shorter contact beams, since less plastic material can be used to secure the contact. Because, tolerances can be held more tightly, a shorter contact beam can be used, since less compliance is required to accommodate the mating. The particular receptacle configuration shown, with the open bottom can be used to further advantage, since the nose of the plug can extend almost to the printed circuit board surface, thereby increasing the contact "wipe" characteristics of the connector.

Another advantage of the connector design is that the solder tails are insert molded in place. That is, they are formed prior to molding rather than after it. In this case the precise nature of the mold tooling helps to define the co-planarity of the contacts, rather than bending on plastic material, which can be a source of considerable variation. The bottom surface of the connector is flat providing a barrier to flux and other contaminants to the contact area, as compared to conventional designs in which there openings underneath the connector to accommodate the lead thickness and bend radius.

There are applications for board-to-board, mezzanine style connector system where connectors are required to be applied in tandem. This might be required to accommodate pin counts beyond the design capability of an individual connector or process, or to give stability to an otherwise unstable board-to-board structure. In any case, the biggest problem in accomplishing this is to easily make sure that the dimensional variation between the two connectors does not exceed the mating tolerances allowed between them. One obvious method is to carefully fixture the two connectors with external tooling that assures the correct relationship between the two connectors. This can be readily accomplished in limited production circumstances where cost is not a major problem, but could prove difficult and expensive in high volume applications, where multiple fixtures would have to be built and maintained. Another approach has been to mold the two connectors together with a connecting bar or bars. this would be adequate in very high volume applications which could justify this type of tooling approach, but it could have limited use in relatively low volume application or in cases where the connector spacing could change. The permanent bars could also interfere with other devices on either side of the board assembly when they are plugged together.

Another approach to this problem would be to have an external molded interconnecting bar, that could serve as a disposable fixture. This bar could preferably be mounted to the top of the connector housing with latching features or by simple friction fit to the connector contacts. The cap thereby formed over the connector contacts could be utilized as a pickup cap for robotic placement and as protection against contact contamination. The cap/fixture could be removed after soldering and recycled. These could be molded relatively inexpensively in a number of different lengths and spacings and be made available in a variety of custom configurations.

It will be appreciated that an electrical connector has been described that is dense, small and mechanically rugged and which can be efficiently and economically manufactured.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for manufacturing an electrical connector comprising the steps of:

(I) producing a receptacle by the steps of:

(a) providing a receptacle mold comprising:

(i) a first receptacle mold member having a planar section and a medial projection having a medial surface and opposed lateral surfaces; and (ii) a second receptacle mold member having a medial section and a pair of inner opposed lateral projections and a pair of outer opposed lateral projections and said second member being capable of being superimposed over said first member such that each of said inner opposed lateral projections are positioned adjacent the opposed lateral surfaces of the medial projection of the first member and that each of said outer opposed lateral projections are adjacent the planar section of the first member such that a medial cavity and opposed lateral cavities are formed between said first and second members;

(b) then interposing a pair of opposed conductive members having inner and outer terminal ends between said first and second receptacle mold members such that the inner terminal ends are in spaced relation in the medial cavity and each of said conductive members is interposed in contacting relation between one of the opposed lateral surfaces of the medial projection of the first member and one of the inner lateral projections of the first member and then pass through one of the lateral cavities and then are interposed in contacting relation between the planar section of the first member and one of the outer lateral projections; and (c) then at least partially filling said lateral cavities with a liquid polymeric molding compound and allowing said molding compound to solidify so as to form opposed solid insulative lateral support structures each having one of said conductive elements embedded therein and extending therefrom to form exposed sections of each of said conductive elements and removing the solidified molding compound with embedded conductive elements from the receptacle mold to form a receptacle for the electrical connector;

(II) producing a plug by the steps of:

(a) providing a plug mold comprising:

(i) a first plus mold member having a planar section and a medial projection having a medial surface and opposed lateral surfaces; and (iii) a second plug mold member having a medial section and a pair of inner opposed lateral projections and a pair of outer opposed lateral projections and said second member being capable of being superimposed over said first member such that each of said inner opposed lateral projections are positioned adjacent the opposed lateral surfaces of the medial projection of the first member and that each of said outer opposed lateral projections are adjacent the planar section of the first member such that a medial cavity and opposed lateral cavities are formed between said first and second members;

(b) then interposing a pair of opposed conductive elements having inner and outer terminal ends between said first and second plug mold members such that the inner terminal ends are in spaced relation in the medial cavity and each of the conductive members is interposed in contacting relation between one of the opposed lateral surfaces of the medial projection of the first member and one of inner lateral projections of the first member and then pass through one of the lateral cavities and then are interposed in contacting relation between the planar section of the first member and one of the outer lateral projections;

(c) then at least partially filling both the lateral cavities and the medial cavities of said Plug mold with a liquid polymeric molding compound and allowing said molding compound to solidify so as to form opposed solid insulative lateral support structures and a solid insulative medial support structure wherein each of the insulative lateral support structures has one of said conductive elements embedded therein and extending therefrom to be embedded in the insulative medial support structure so that there is an exposed section on each of the conductive elements between the insulative lateral support structures and the insulative medial support structure and removing said solidified molding compound from the p mold to form a plug for the electrical connector; and (III) positioning said plug relative to said receptacle such that the exposed sections on each of the conductive elements in said plug is in contact with one of the exposed sections on each of the conductive elements in said receptacle.

2. The method of claim 1 wherein the polymeric molding compound is a liquid crystal polymer.

* * * * *